United States Patent
Omelchenko (10) Patent No.: US 11,076,719 B2
(45) Date of Patent: Aug. 3, 2021

(54) APPLIANCE IRON FOR MAKING EDIBLE SPOONS

(71) Applicant: Anatoliy Omelchenko, Brooklyn, NY (US)

(72) Inventor: Anatoliy Omelchenko, Brooklyn, NY (US)

(*) Notice: Subject to any disclaimer, the term of this patent is extended or adjusted under 35 U.S.C. 154(b) by 392 days.

(21) Appl. No.: 16/350,661

(22) Filed: Dec. 17, 2018

(65) Prior Publication Data

US 2019/0117014 A1 Apr. 25, 2019

Related U.S. Application Data

(60) Provisional application No. 62/276,280, filed on Jan. 8, 2016.

(51) Int. Cl.
| | |
|---|---|
| *A47J 37/06* | (2006.01) |
| *A21B 5/02* | (2006.01) |
| *A47J 37/08* | (2006.01) |
| *A21D 13/48* | (2017.01) |
| *H05B 3/68* | (2006.01) |

(52) U.S. Cl.
CPC ........... *A47J 37/0611* (2013.01); *A21B 5/023* (2013.01); *A21D 13/48* (2017.01); *A47J 37/0892* (2013.01); *A47J 37/0676* (2013.01); *H05B 3/68* (2013.01)

(58) Field of Classification Search
CPC ......... A47J 37/0611; A21B 5/023; A21B 5/02
USPC ......... 99/439, 440, 441, 380, 381, 384, 430, 99/432; 30/316
See application file for complete search history.

(56) References Cited

U.S. PATENT DOCUMENTS

| | | | |
|---|---|---|---|
| 170,849 A | 12/1875 | Hamilton | |
| 1,520,457 A * | 12/1924 | Vaughan | A47J 37/0611 99/381 |
| 1,740,649 A * | 12/1929 | Heyboer | A47J 37/0611 99/383 |
| 2,597,541 A | 5/1952 | Squires | 99/377 |
| D193,541 S * | 9/1962 | Gordon | A47J 27/004 D1/123 |
| D278,305 S | 4/1985 | Madl et al. | D7/352 |
| 5,921,153 A * | 7/1999 | Barnett | B21D 37/205 76/107.8 |
| 6,034,359 A * | 3/2000 | Busch | A47J 27/004 219/497 |
| D466,361 S | 12/2002 | Wanat et al. | D7/352 |

(Continued)

FOREIGN PATENT DOCUMENTS

| | | | |
|---|---|---|---|
| CN | 202287549 U | 7/2012 | ............... A23P 1/10 |
| CN | 203181928 U | 9/2013 | ............... A23G 1/50 |

(Continued)

*Primary Examiner* — Reginald Alexander
(74) *Attorney, Agent, or Firm* — Larson & Larson, P.A.; Justin P. Miller; Frank Liebenow (57) ABSTRACT

An appliance iron for making edible spoons that dissociate into consumable predetermined clumps in order to prevent a dissociating into random granules that would make a consumption more difficult. The appliance iron includes a housing, a plate, and an electrical circuit. The plate is disposed within the housing, and is so shaped for providing the edible spoons that dissociate into the consumable predetermined clumps in order to prevent the dissociating into the random granules that would make the consumption more difficult. The electrical circuit heats up the plate.

18 Claims, 6 Drawing Sheets

(56) References Cited

U.S. PATENT DOCUMENTS

| | | | |
|---|---|---|---|
| 7,335,860 B2 | 2/2008 | Li | 219/450.1 |
| D681,910 S | 5/2013 | Peterson et al. | D1/123 |
| D689,729 S | 9/2013 | Yan | D7/352 |
| 8,692,164 B2 | 4/2014 | Krishnan | 219/450.1 |
| 9,265,380 B2 | 2/2016 | Krishnan et al. | |
| 2005/0076516 A1* | 4/2005 | Groll | A21C 11/106 30/315 |
| 2011/0091521 A1* | 4/2011 | Omelchenko | A23G 3/50 424/439 |
| 2014/0106037 A1* | 4/2014 | Endres | A21B 5/023 426/138 |
| 2014/0272022 A1* | 9/2014 | Acampora | A21D 8/06 426/134 |
| 2017/0225221 A1* | 8/2017 | Kim | B21D 53/62 |

FOREIGN PATENT DOCUMENTS

| | | | |
|---|---|---|---|
| EP | 2965673 A1 | 1/2016 | A47J 37/06 |
| GB | 316671 * | 7/1930 | |
| WO | WO/2012/098448 A1 | 7/2012 | A23L 1/00 |

\* cited by examiner

APPLIANCE IRON FOR MAKING EDIBLE SPOONS

CROSS REFERENCE TO RELATED APPLICATIONS

The instant non-provisional patent application claims priority from provisional patent application No. 62/276,280, filed on Jan. 8, 2016, for an EDIBLE SPOON MAKER, and which is incorporated herein in its entirety by reference thereto.

BACKGROUND OF THE INVENTION

Field of the Invention

The embodiments of the present invention relate to an appliance iron, and more particularly, the embodiments of the present invention relate to an appliance iron for making edible spoons that dissociate into consumable predetermined clumps in order to prevent dissociating into random granules that would make consumption more difficult.

Description of the Prior Art

An iron is a utensil or appliance used to cook desired foods. It usually consists of two hinged metal plates, molded to create the pattern of the desired foods, such as edible spoons. The iron is heated, and either batter is poured or dough is placed between the plates, which is then closed to bake the desired foods.

An edible spoon contains an edible selected from the group consisting of a desert food, vitamin(s), medication(s), breath mint(s), hard candy, candy, chocolate, etc., and combinations thereof that are substantially resistant to deformation and disintegration due to contact with a drinkable liquid or an edible food for an acceptable period of time.

The bowl of an edible spoon is dissociated into consumable predetermined clumps by, preferably, biting off a consumable predetermined clump, snapping off a consumable predetermined clump, etc., after the edible spoon has been utilized for its intended purpose, and as such, the edible spoon is, preferably, made from corn flour, wheat flour, salt, and water, and secondarily, chili pepper and sugar, and when mixed, are substantially resistant to deformation and disintegration due to contact with a drinkable liquid or an edible food for an acceptable period of time.

Numerous innovations for cooking appliances have been provided in the prior art, which will be described, infra, in chronological order to show advancement in the art, and which are incorporated herein in their entirety by reference thereto. Even though these innovations may be suitable for the specific individual purposes to which they address, however, they differ from the embodiments of the present invention in that they do not teach an appliance iron for making edible spoons that dissociate into consumable predetermined clumps in order to prevent dissociating into random granules that would make consumption more difficult.

U.S. Pat. No. 170,849 to Hamilton

U.S. Pat. No. 170,849—issued to Hamilton on Dec. 7, 1875—teaches a stove top having nicks placed out of the center line of the top, and tapering bearing for the pins of the long section. The section has the pins or projections.

U.S. Pat. No. 2,597,541 to Squires

U.S. Pat. No. 2,597,541—issued to Squires on May 20, 1952 in US class 99 and subclass 377—teaches a cooking utensil having an elongated plate, a band secured around the margin of the plate, inwardly pointed spring detent prongs secured to the free margin of the inner face of the band at opposite ends of the base and pointed toward the plate, a flat sheet steel heater carrier disposed adjacent to the major portion of the plate within the band and provided at opposite ends with outwardly projecting spring tongue projections from the plane of the carrier and engageable with the inner face of the free ends of the prongs and adapted to be released by pressing the prong and to be restored against the inner face of the prong by pressing the tongue, ceramic supports are carried on the plate, radial heating coils carried by the support, and a cooking plate adjacent to the free edge of the band.

U.S. Pat. No. Des. 278,305 to Madl et al.

U.S. Pat. No. Des. 278,305—issued to Madl et al. on Apr. 9, 1985 in US class D7 and subclass 352—teaches the ornamental design for a waffle maker.

U.S. Pat. No. Des. 466,361 to Wanat et al.

U.S. Pat. No. Des. 466,361—issued to Wanat et al. on Dec. 3, 2002 in US class D7 and subclass 352—teaches the ornamental design for a waffle maker.

U.S. Pat. No. 7,335,860 to Li

U.S. Pat. No. 7,335,860—issued to Li on Feb. 26, 2008 in US class 219 and subclass 450.1—teaches a multi-functional griddle having hinged top and bottom heating plate assemblies that receive reversible cooking plates, or alternatively, interchangeable cooking plates for cooking different types of foods, such as, waffles, pancakes, and hot sandwiches. In one embodiment, the reversible cooking plates are nested in face-to-face contact with mating top and bottom heating plates to improve heat transfer to the cooking plates. This is accomplished by forming a mating waffle grid in the heating plates for receiving the waffle iron surfaces of the cooking plates in intermeshing engagement. The intermeshing engagement of the cooking plates with the heating plates also reduces the overall vertical height of the appliance providing a slimmer profile. In an alternative embodiment, a set of interchangeable cooking plates is provided having a sliding interface with modified heating plates. In this embodiment, the cooking plates are interchanged to vary the cooking configurations of the appliance.

Chinese Patent Number CN202287549U to Liang

Chinese Patent Number CN202287549U—issued to Liang on Jul. 4, 2012 in International class A23P1 and subclass 10—teaches a mold for pressing an edible spoon. The mold for pressing the edible spoon is made of a heat-resistant material, and is provided with an upper pressing mold that is positioned on the upper part of the mold and a lower pressing mold that is positioned on the lower part of the mold. A mold cavity with a spoon molding is formed between the upper pressing mold and the lower pressing mold. By the mold for pressing the edible spoon, food raw materials, such as, flour, rice flour, and the like can be put into the mold cavity, compacted by the upper pressing mold and the lower pressing mold, and then put into a baking oven for heating and drying, or the mold has a structure capable of heating the spoon, so that a disposable spoon made of foods can be made. The spoon can be directly eaten after yoghourt and jellies are eaten by using the spoon, so that the waste is avoided, and the spoon degrades, and cannot pollute the environment even, if the spoon is thrown away.

WIPO Patent Application WO/2012/098448A1 to Durr

WIPO Patent Application WO/2012/098448A1—published to Durr on Jul. 26, 2012 in International class A23L1 and subclass 00—teaches eco-friendly, biodegradable, and edible cutleries, chopsticks, and all utensils used to lift food into mouth. The cutleries, chopsticks, and all utensils are made of flours having about 65% or above carbohydrate content and contain no added preservatives or chemical additives and having a shelf life of a year or more. The method of preparing eco-friendly, biodegradable, and edible cutleries, chopsticks, and all utensils used to lift food into mouth is also taught.

U.S. Pat. No. Des. 681,910 to Peterson et al.

U.S. Pat. No. Des. 681,910—issued to Peterson et al. on May 14, 2013 in US class D1 and subclass 123—teaches the ornamental design for an edible spoon.

Chinese Patent Number CN203181928U to Ge

Chinese patent number CN203181928U—issued to Ge on Sep. 11, 2013 in International class A23G1 and subclass 50—teaches a tableware-type edible chocolate. The shape of the chocolate is set into a chopstick with a cartoon modeling and a spoon-shaped blank body. The outer surface of the blank body is coated with a layer of waterproof and temperature-resistant paper material.

U.S. Pat. No. Des. 689,729 to Yan

U.S. Pat. No. Des. 689,729—issued to Yan on Sep. 17, 2013 in US class D7 and subclass 352—teaches the ornamental design for a waffle-maker.

U.S. Pat. No. 8,692,164 to Krishnan

U.S. Pat. No. 8,692,164—issued to Krishnan on Apr. 8, 2014 in US class 219 and subclass 450.1—teaches a cooking appliance for producing flatbreads or other foodstuffs. The cooking appliance includes a base, a lower heating assembly, and an upper heating assembly. The lower heating assembly includes a lower cooking surface, and the upper heating assembly includes an upper cooking surface. The upper cooking surface is translatable and rotatable relative to the lower cooking surface. The upper cooking surface is locatable in at least three operative positions relative to the lower cooking surface.

European Patent Application EP2965673 A1 to Ogawa

European Patent Application EP2965673 A1—published to Ogawa on Jan. 13, 2016 in International class A47J37 and subclass 06—teaches an electric cooker in which a different-height upper or lower die is mounted without necessity of replacing a hinge or upper and lower housings or of manufacturing an electric cooker exclusively used for each baked product. The electric cooker includes a lower housing, a lower die mounted on the lower housing, an upper housing pivotally mounted at the rear end via a hinge shaft to the lower housing to turn upward from the lower housing upward, an upper die mounted on the upper housing, a lower surface of the upper die being capable of being disposed in an upper surface of the lower die, an electric heater disposed in at least one of the lower housing and upper housing and heating at least one of the lower die and the upper die from back to heat dough for bread or the like between the lower die and the upper die, and hinge-shaft height adjusting apparatus changing a vertical position of the upper housing pivotally mounted via the hinge shaft by adjusting height of the hinge shaft.

U.S. Pat. No. 9,265,380 to Krishnan et al.

U.S. Pat. No. 9,265,380—issued to Krishnan et al. on Feb. 23, 2016 in US class land subclass 1—teaches a method of using a cooking appliance having a first heating assembly with a first cooking surface, a second heating assembly with a second cooking surface, and a guide post. The method includes causing the guide post to be placed into a receiving aperture. The method further includes translating the first heating assembly from a first operative position to a second operative position. The placement of the guide post into the receiving aperture causes the first heating assembly to translate in a substantially linear manner and to be maintained substantially parallel to the second heating assembly during translation of the first heating assembly from the first operative position to the second operative position. The method also includes removing the guide post from the receiving aperture and causing the guide post to be placed in a resting aperture.

It is apparent that numerous innovations for cooking appliances have been provided in the prior art, which are adapted to be used. Furthermore, even though these innovations may be suitable for the specific individual purposes to which they address, however, they would not be suitable for the purposes of the embodiments of the present invention as heretofore described, namely, an appliance iron for making edible spoons that dissociate into consumable predetermined clumps in order to prevent dissociating into random granules that would make consumption more difficult.

SUMMARY OF THE INVENTION

Thus, it is an object of the embodiments of the present invention to provide an appliance iron for making edible spoons that dissociate into consumable predetermined clumps in order to prevent dissociating into random granules that would make consumption more difficult, which avoids the disadvantages of the prior art.

Briefly stated, another object of the embodiments of the present invention is to provide an appliance iron for making edible spoons that dissociate into consumable predetermined clumps in order to prevent dissociating into random granules that would make consumption more difficult. The appliance iron includes a housing, a plate, and an electrical circuit. The plate is disposed within the housing, and is so shaped for providing the edible spoons that dissociate into the consumable predetermined clumps in order to prevent the dissociating into the random granules that would make the consumption more difficult. The electrical circuit heats up the plate.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawings.

BRIEF DESCRIPTION OF THE FIGURES OF THE DRAWING

The figures of the drawings are briefly described as follows.

LIST OF REFERENCE NUMERALS UTILIZED IN THE FIGURES OF THE DRAWING

Introductory

| | |
|---|---|
| 20 | appliance iron of embodiments of present invention for making edible spoons 22 |
| 22 | edible spoons |

Overall Configuration of Appliance Iron 20

| | |
|---|---|
| 24 | housing of appliance iron 20 |
| 26 | plate of appliance iron 20 |
| 28 | electrical circuit of appliance iron 20 |
| 29 | consumable predetermined clumps of edible spoons 22 |
| 29a | random granules of edible spoons 22 |
| 29b | consumption of edible spoons 22 |
| 30 | cutter for cutting dough for placing on plate 26 for making edible spoons 22 |

Specific Configuration of Housing 24 and Plate 26

Housing 24

| | |
|---|---|
| 32 | lower portion of housing 24 |
| 34 | upper portion of housing 24 |
| 36 | handle of upper portion 34 of housing 24 |
| 38 | handle of lower portion 32 of housing 24 |
| 40 | combination handle for being comfortable when housing 24 is closed and carried |
| 42 | catch of combination handle 40 |

Plate 26

| | |
|---|---|
| 44 | lower portion of plate 26 |
| 46 | upper portion of plate 26 |
| 48 | male mold portion of upper portion 46 of plate 26 |
| 50 | female mold portion of lower portion 44 of plate 26 |
| 52 | plurality of male bowl molds of male mold portion 48 of upper portion 46 of plate |
| 54 | plurality of associated male handle molds of male mold portion of upper portion 46 of plate 26 |
| 56 | plurality of female bowl molds of female mold portion 50 of lower portion 44 of plate 26 |
| 58 | plurality of associated female handle molds of female mold portion 50 of lower portion 44 of plate 26 |
| 60 | plurality of raised weakening lines of plurality of female bowl molds 56 of female mold portion 50 of lower portion 44 of plate 26 |
| 62 | matrix of plurality of raised weakened lines 60 of plurality of female bowl molds 56 of female mold portion 50 of lower portion 44 of plate 26 for providing dissociate into consumable predetermined clumps 29 in order to prevent dissociating into random granules 29a that would make consumption 29b more difficult |
| 64 | axial raising of matrix 62 of plurality of raised weakened lines 60 of plurality of female bowl molds 56 of female mold portion 50 of lower portion 44 of plate 26 |
| 66 | plurality of lateral raised weakened lines of plurality of raised weakened lines 60 of plurality of female bowl molds 56 of female mold portion 50 of lower portion 44 of plate 26 |

Specific Configuration of Electrical Circuit 28

| | |
|---|---|
| 68 | first lamp of electrical circuit 28 |
| 69 | pair of nodes of first lamp 68 of electrical circuit 28 |
| 70 | second lamp of electrical circuit 28 |
| 71 | pair of nodes of second lamp 70 of electrical circuit 28 |
| 72 | pair of buses of electrical circuit 28 |
| 74 | pair of free terminal nodes of pair of buses of electrical circuit for electrically communicating with 120 V power source 76 |
| 76 | 120 V power source |
| 77 | line of pair of buses 72 of electrical circuit 28 |
| 78 | neutral of pair of buses 72 of electrical circuit 28 |
| 79 | fuse of electrical circuit 28 |
| 80 | switch of electrical circuit 28 |
| 82 | first heater of electrical circuit 28 |
| 84 | pair of nodes of first heater 82 of electrical circuit 28 |
| 86 | second heater of electrical circuit 28 |
| 88 | pair of nodes of second heater 86 of electrical circuit 28 |

Specific Configuration of Cutter 30

| | |
|---|---|
| 90 | band of cutter 30 |
| 92 | wide portion of band 90 of cutter 30 for cutting dough for bowl of edible spoon 22 |
| 94 | narrow portion of band 90 of cutter 30 for cutting dough for handle of edible spoon 22 |

DETAILED DESCRIPTION OF THE PREFERRED EMBODIMENTS

Introductory

Figure 1:
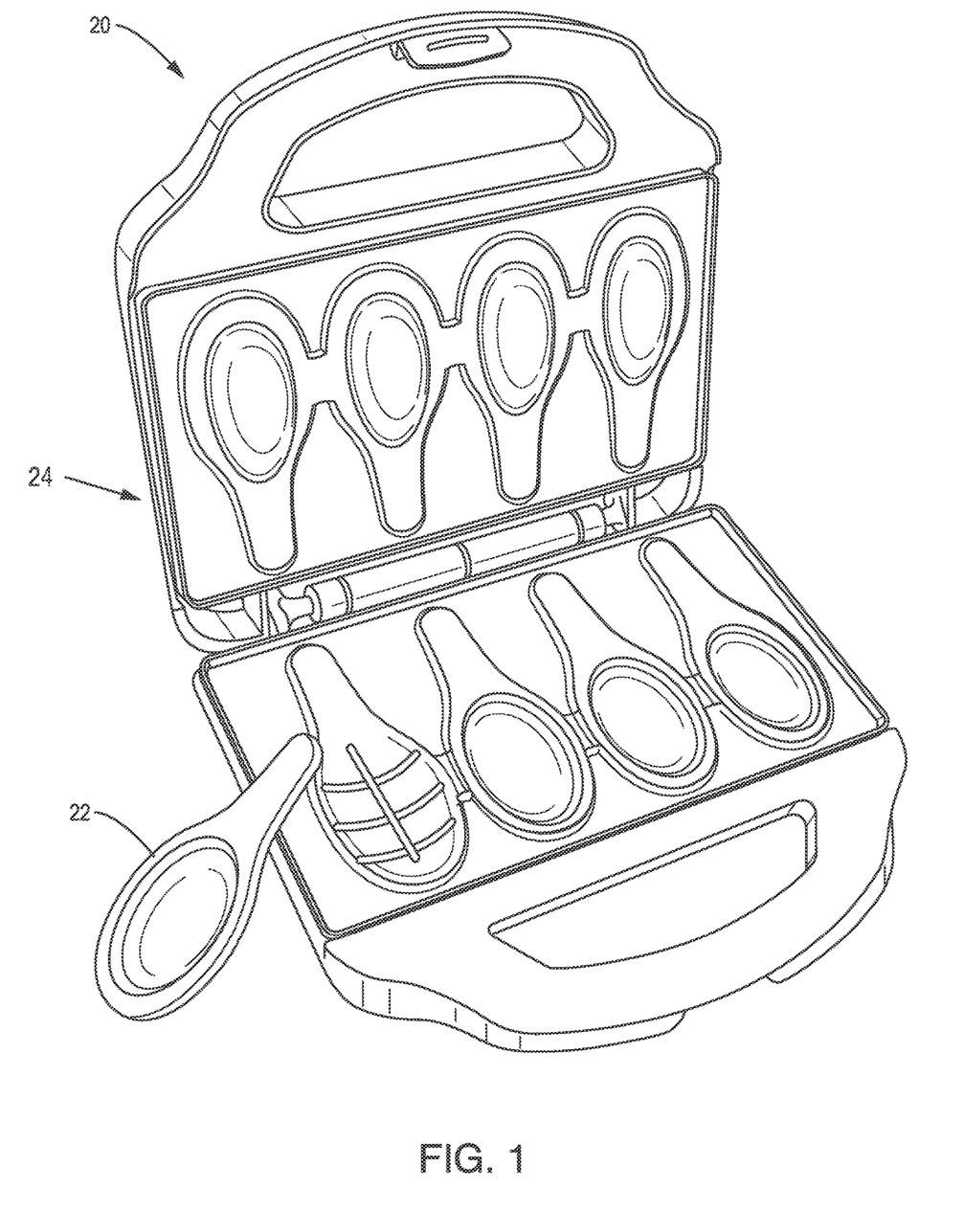
FIG. 1 is a diagrammatic perspective view of the appliance iron of the embodiments of the present invention being open and showing the edible spoons made thereby and in the process of being removed from the appliance iron.
Figure 2:
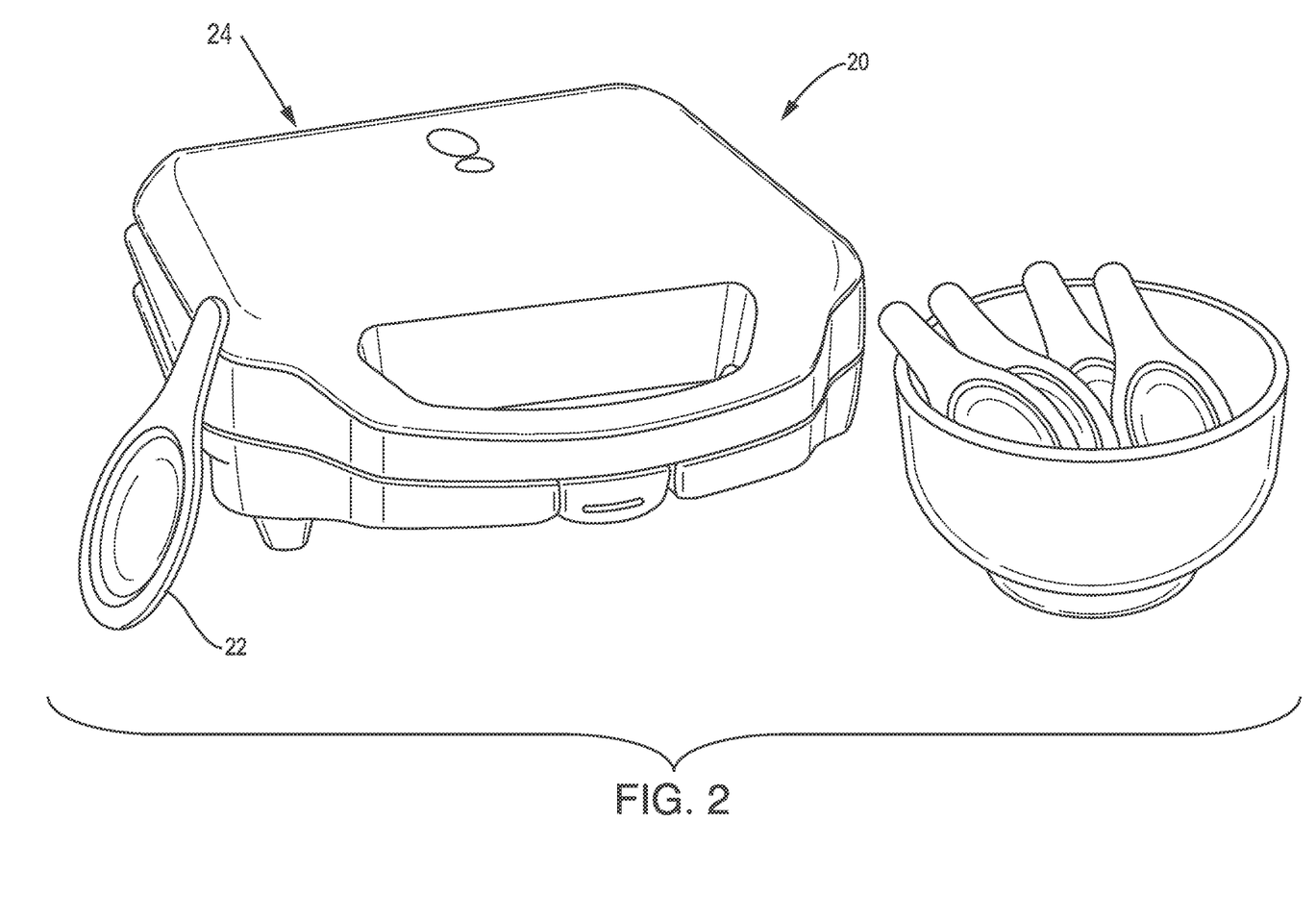
FIG. 2 is a diagrammatic perspective view of the appliance iron of the embodiments of the present invention being closed and showing some edible spoons made thereby removed from the appliance iron and placed in proximity thereof.

Referring now to the figures of the drawing, in which like numerals indicate like parts, and particularly to FIGS. 1 and 2, the appliance iron of the embodiments of the present invention is shown generally 20 for making edible spoons 22.

Overall Configuration of the Appliance Iron 20

Figure 3:
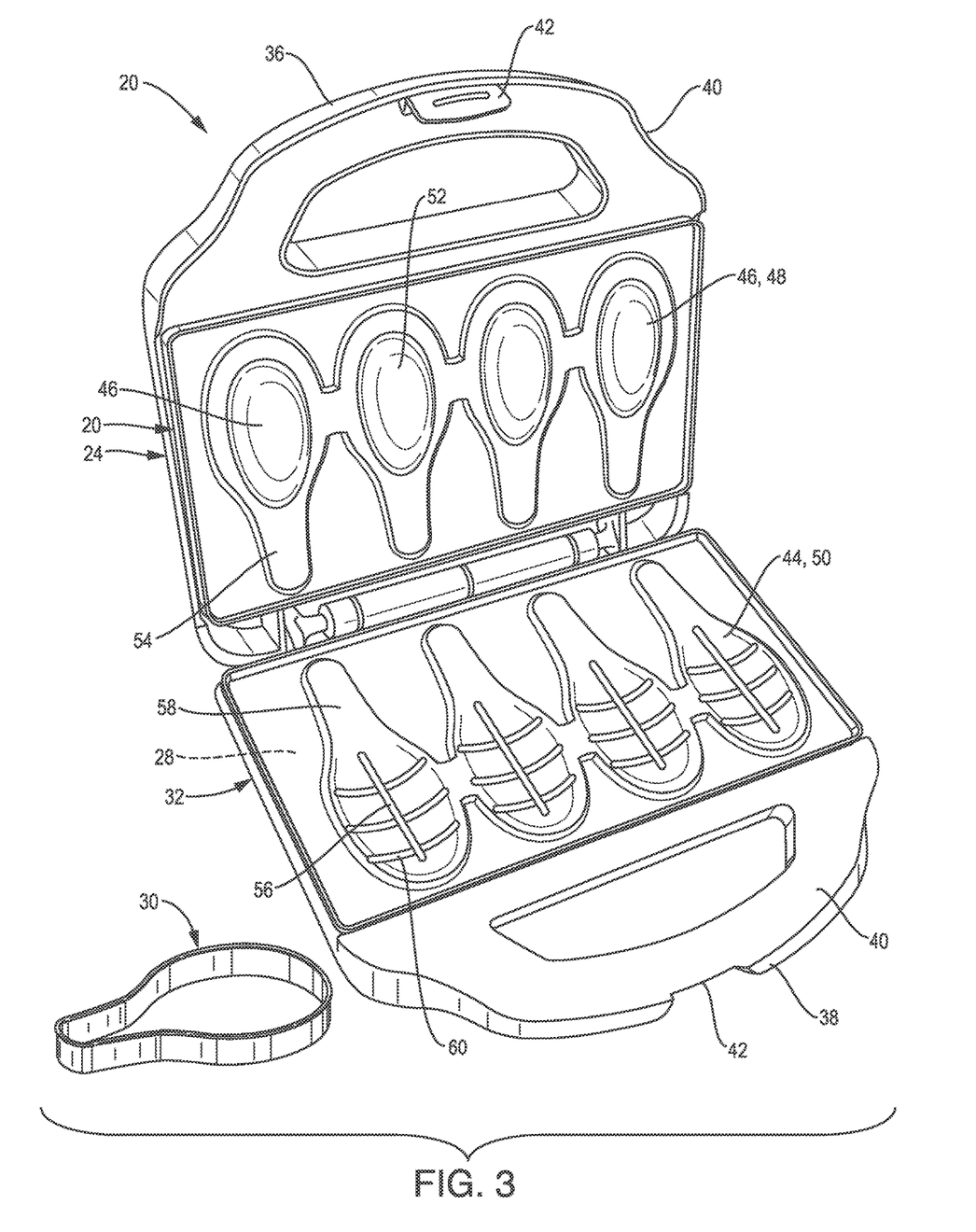
FIG. 3 is a diagrammatic perspective view of the appliance iron of the embodiments of the present invention identified by ARROW 3 in FIGS. 1 and 2.

The overall configuration of the appliance iron 20 can best be seen in FIG. 3, and as such, will be discussed with reference thereto.

The appliance iron 20 comprises a housing 24, a plate 26, and an electrical circuit 28. The plate 26 is disposed within the housing 24, and is so shaped for providing the edible spoons 22 that dissociate into consumable predetermined clumps 29 in order to prevent a dissociating into random granules 29a that would make consumption 29b more difficult. The electrical circuit 28 heats up the plate 26.

The appliance iron 20 further comprises a cutter 30. The cutter 30 cuts dough for placing on the plate 26 for making the edible spoons 22.

Specific Configuration of the Housing 24 and the Plate 26

The specific configuration of the housing 24 and the plate 26 can best be seen in FIG. 3, and as such, will be discussed with reference thereto.

Housing 24

The housing 24 includes a lower portion 32 and an upper portion 34. The upper portion 34 of the housing 24 is pivotally attached to the lower portion 32 of the housing 24 so as to allow the housing 24 to be opened and closed.

The upper portion 34 of the housing 24 has a handle 36, and the lower portion 32 of the housing 24 has a handle 38. The handle 38 of the lower portion 32 of the housing 24 generally mimics the handle 36 of the upper portion 34 of the housing 24 so as form a combination handle 40 for being comfortable when the housing 24 is closed and carried.

The handle 38 of the lower portion 32 of the housing 24 and the handle 36 of the upper portion 34 of the housing 24 are selectively maintained closed by a catch 42.

Plate 26

The plate 26 includes a lower portion 44 and an upper portion 46. The upper portion 46 of the plate 26 is disposed in the upper portion 34 of the housing 24, and the lower portion 44 of the plate 26 is disposed in the lower portion 34 of the housing 24.

The upper portion 46 of the plate 26 is a male mold portion 48, and the lower portion 44 of the plate 26 is a female mold portion 50.

The male mold portion 48 of the upper portion 46 of the plate 26 includes a plurality of male bowl molds 52 and a plurality of associated male handle molds 54. The plurality of male bowl molds 52 of the male mold portion 48 of the upper portion 46 of the plate 26 extend from, and communicate with, the plurality of associated male handle molds 54 of the male mold portion 48 of the upper portion 46 of the plate 26, respectively.

The female mold portion 50 of the lower portion 44 of the plate 26 includes a plurality of female bowl molds 56 and a plurality of associated female handle molds 58. The plurality of female bowl molds 56 of the female mold portion 50 of the lower portion 44 of the plate 26 extend from, and communicate with, the plurality of associated female handle molds 58 of the female mold portion 50 of the lower portion 44 of the plate 26, respectively.

The plurality of male bowl molds 52 of the male mold portion 48 of the upper portion 46 of the plate 26 align with the plurality of female bowl molds 56 of the female mold portion 50 of the lower portion 44 of the plate 26, respectively, and the plurality of associated male handle molds 54 of the male mold portion 48 of the upper portion 46 of the plate 26 align with the plurality of associated female handle molds 58 of the female mold portion 50 of the lower portion 44 of the plate 26, respectively, when the housing 24 is closed.

The plurality of female bowl molds 56 of the female mold portion 50 of the lower portion 44 of the plate 26 contain a plurality of raised weakening lines 60. The plurality of raised weakened lines 60 of the plurality of female bowl molds 56 of the female mold portion 50 of the lower portion 44 of the plate 26 form a matrix 62 for allowing the edible spoons 22 to dissociate into the consumable predetermined clumps 29 in order to prevent the dissociating into the random granules 29a that would make the consumption 29b more difficult.

The matrix 62 of the plurality of raised weakened lines 60 of the plurality of female bowl molds 56 of the female mold portion 50 of the lower portion 44 of the plate 26, respectively, includes an axial raised weakened line 64 and a plurality of lateral raised weakened lines 66. The plurality of lateral raised weakened lines 66 of the matrix 62 of the plurality of raised weakened lines 60 of the plurality of female bowl molds 56 of the female mold portion 50 of the lower portion 44 of the plate 26 crosses the axial raised weakened line 66 of the matrix 62 of the plurality of raised weakened lines 60 of the plurality of female bowl molds 56 of the female mold portion 50 of the lower portion 44 of the plate 26, respectively.

Specific Configuration of the Electrical Circuit 28

Figure 4:
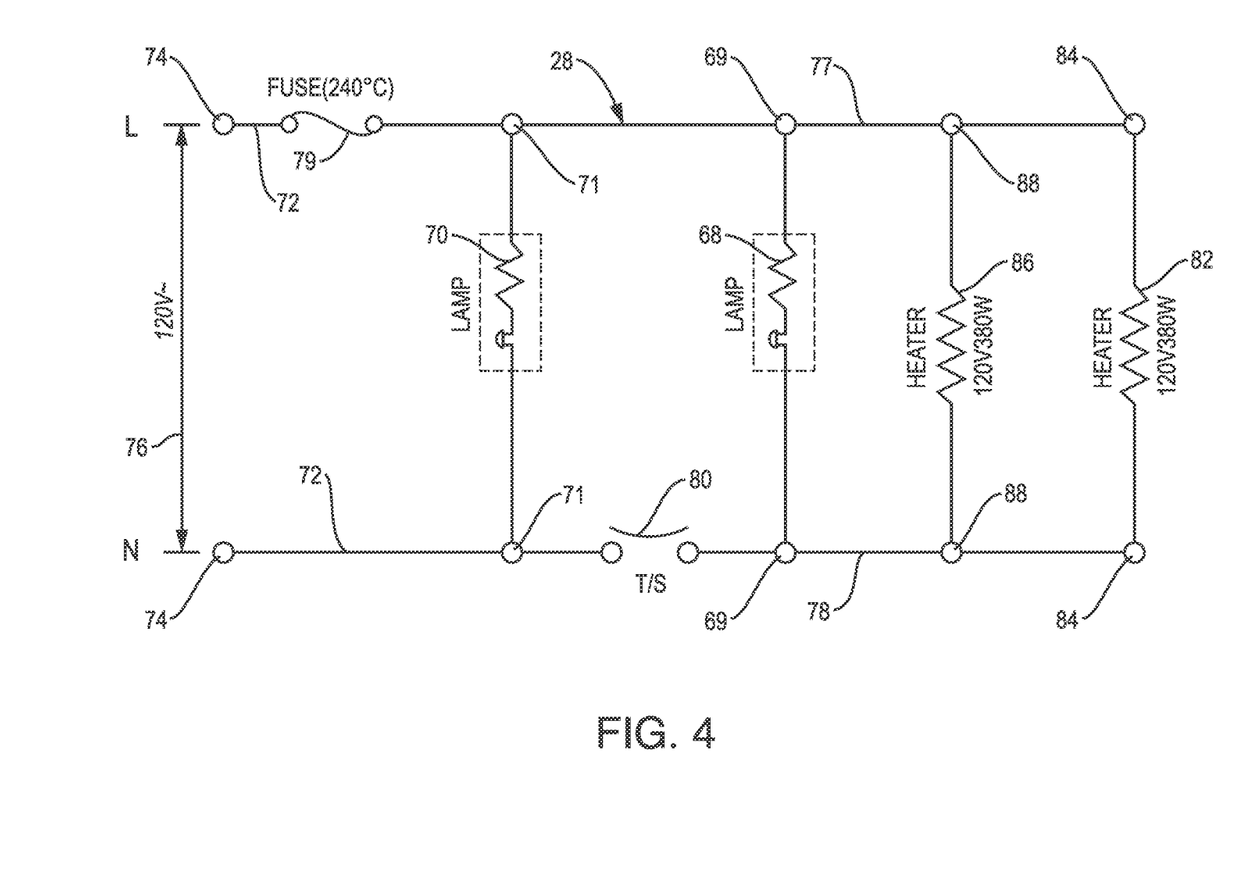
FIG. 4 is a diagrammatic schematic diagram of the electrical circuit of the appliance iron of the embodiments of the present invention shown in FIG. 3.
Figure 5:
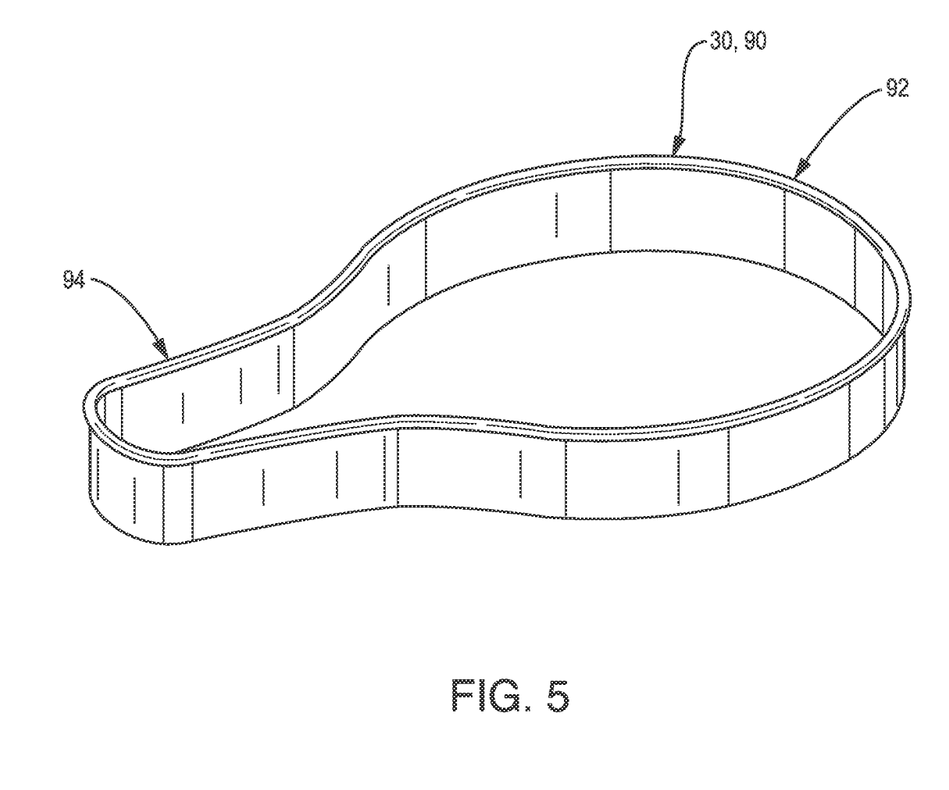
FIG. 5 is a diagrammatic perspective view of the cutter of the appliance iron of the embodiments of the present invention.
Figure 6:
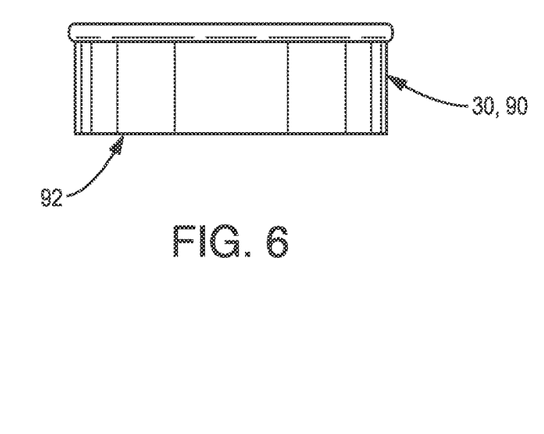
FIG. 6 is a diagrammatic end view of the cutter of the appliance iron of the embodiments of the present invention taken generally in the direction of ARROW 6 in FIG. 5.
Figure 7:
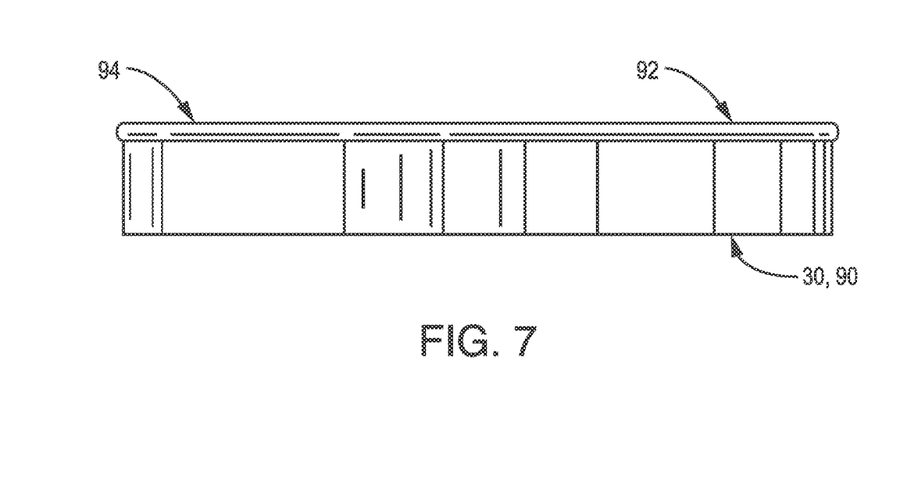
FIG. 7 is a diagrammatic side elevational view of the cutter of the appliance iron of the embodiments of the present invention taken generally in the direction of ARROW 7 in FIG. 5.
Figure 8:
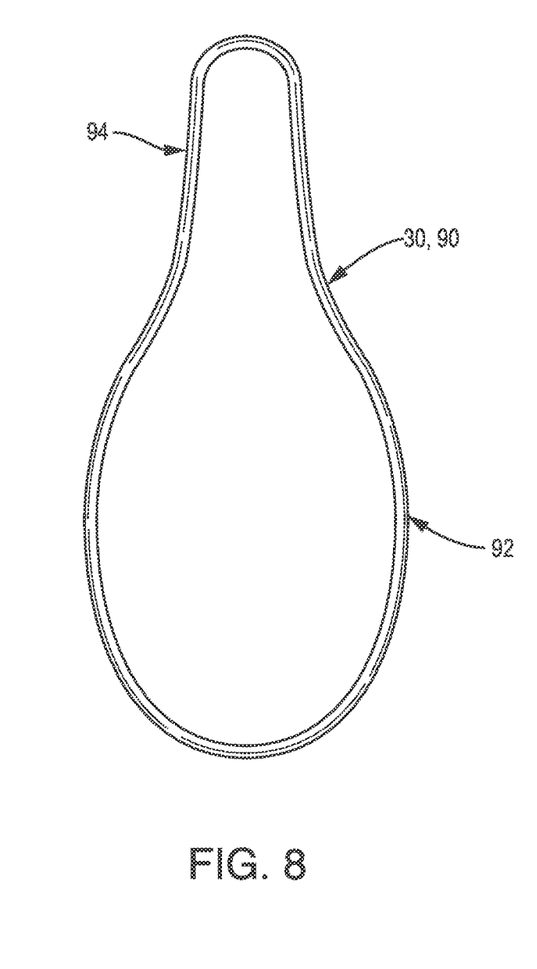
FIG. 8 is a diagrammatic top plan view of the cutter of the appliance iron of the embodiments of the present invention taken generally in the direction of ARROW 8 in FIG. 5.

The specific configuration of the electrical circuit 28 can best bees in FIG. 4, and as such, will be discussed with reference thereto.

The electrical circuit 28 includes a first lamp 68 having a pair of nodes 69. The first lamp 68 of the electrical circuit 28 illuminates green when the edible spoon maker 20 is hot enough, and thereby ready to cook the edible spoons 22.

The electrical circuit 28 further includes a second lamp 70 having a pair of nodes 71. The second lamp 70 of the electrical circuit 28 illuminates red when the edible spoons 22 have been cook.

The first lamp 68 of the electrical circuit 28 electrically communicates with a pair of buses 72, via the nodes 69 thereof, while the second lamp 70 of the electrical circuit 28 electrically communicates with the pair of buses 72, via the nodes 71 thereof, and in so doing, the second lamp 70 of the electrical circuit 28 is electrically parallel to the first lamp 68 of the electrical circuit 28.

The pair of buses 72 of the electrical circuit 28 terminate in a pair of free terminal nodes 74, respectively. The pair of free terminal nodes 74 of the pair of buses 72 of the electrical circuit 28 are for electrically communicating with a 120V power source 76 for powering the appliance iron 20. The pair of buses 72 of the electrical circuit 28 include a line 77 and a neutral 78.

The electrical circuit 28 further includes a fuse 79. The fuse 79 of the electrical circuit 28 is 240° C., electrically communicates serially with the line 77 of the pair of buses 72 of the electrical circuit 28 is for preventing electric damage to the electrical circuit 28.

The electrical circuit 28 further includes a switch 80. The switch 80 of the electrical circuit 28, preferably, is a toggle switch, communicates serially with the neutral 78 of the pair of buses 72 of the electrical circuit 28, and turns the electrical circuit on and off.

The electrical circuit 28 further includes a first heater 82 having a pair of nodes 84. The first heater 82 of the electrical circuit 28 is 120V and 380W heats one of the lower portion 44 of the plate 26 and the upper portion 46 of the plate 26.

The electrical circuit 28 further includes a second heater 86 having a pair of nodes 88. The second heater 86 of the electrical circuit 28 is 120V heats the other one of the lower portion 44 of the plate 26 and the upper portion 46 of the plate 26.

The first heater 82 of the electrical circuit 28 electrically communicates with the pair of buses 72 of the electrical circuit 28 via the nodes 84 thereof, respectively, while the second heater 86 of the electrical circuit 28 electrically communicates with the pair of 72, via the nodes 88 thereof, respectively, and in so doing, the second heater 86 of the electrical circuit 28 is electrically parallel to the first heater 82 of the electrical circuit 28, the first lamp 68 of the electrical circuit 28, and the second lamp 70 of the electrical circuit 28.

Specific Configuration of the Cutter 30

The specific configuration of the cutter 30 can best be seen in FIGS. 5, 6, 7, and 8, and as such, will be discussed with reference thereto.

The cutter 30 is like a cookie-cutter, and comprises a band 90. The band 90 of the cutter 30 is formed into a general keyhole shape, and as such, has a wide bowl portion 92 and a narrow handle portion 94.

The wide bowl portion 92 of the band 90 of the cutter 30 is for cutting the dough for the bowl of the edible spoon 22, while the narrow handle portion 94 of the band 90 of the cutter 30 is for cutting the dough for the handle of the edible spoon 22.

Impressions

It will be understood that each of the elements described above, or two or more together, may also find a useful application in other types of constructions differing from the types described above.

While the embodiments of the present invention have been illustrated and described as embodied in an appliance iron for making edible spoons that dissociate into consumable predetermined clumps in order to prevent dissociating into random granules that would make consumption more difficult, however, they are not limited to the details shown, since it will be understood that various omissions, modifications, substitutions, and changes in the forms and details of the embodiments of the present invention illustrated and their operation can be made by those skilled in the art, without departing in any way from the spirit of the embodiments of the present invention.

Without further analysis, the foregoing will so fully reveal the gist of the embodiments of the present invention that others can, by applying current knowledge, readily adapt them for various applications without omitting features that from the standpoint of prior art fairly constitute characteristics of the generic or specific aspects of the embodiments of the present invention.

The invention claimed is:

1. A device that forms an edible spoon with a bowl, the edible spoon breaking up after use into predetermined clumps, the device comprising:
   an upper plate;
   a lower plate;
      the lower plate including a plurality of female molds;
         each mold of the plurality of female molds including a handle section and a bowl section;
         the bowl section of the plurality of female molds including raised weakening lines, the raised weakening lines crossing each other to form a grid pattern;
      the raised weakening lines dividing the bowl into pieces that are separable at weak points formed by the raised weakening lines;
   whereby the edible spoon is scored across its bowl, thus creating pieces.

2. The device of claim 1, wherein the edible spoon is formed from corn flour.

3. The device of claim 1, wherein the edible spoon is formed from wheat flour.

4. The device of claim 2, wherein the edible spoon is further formed from chili pepper.

5. The device of claim 3, wherein the edible spoon is further formed from chili pepper.

6. The device of claim 1, wherein the edible spoon is formed from materials that resist disintegration due to contact with water.

7. A device that forms an edible spoon with a bowl, the edible spoon breaking up after use into predetermined clumps, the device comprising:
   an upper plate;
   a lower plate;
      the lower plate including a plurality of female bowl molds;
      the plurality of female bowl molds including raised weakening lines, the raised weakening lines crossing each other to form a grid pattern;
      the raised weakening lines dividing the bowl into pieces that are separable at weak points formed by the raised weakening lines;
   whereby the edible spoon is scored across its bowl, thus creating pieces.

8. The device of claim 7, wherein the edible spoon is formed from corn flour.

9. The device of claim 7, wherein the edible spoon is formed from wheat flour.

10. The device of claim 8, wherein the edible spoon is further formed from chili pepper.

11. The device of claim 9, wherein the edible spoon is further formed from chili pepper.

12. The device of claim 7, wherein the edible spoon is formed from materials that resist disintegration due to contact with water.

13. A device to form an edible spoon that breaks into pieces, the device comprising:
   a first plate and a second plate;
      the first plate and the second plate mating to form a plurality of molds, each mold of the plurality of molds to form an edible spoon;
         each mold of the plurality of molds includes a handle section and a bowl section;
   a plurality of raised weakening lines;
      the plurality of raised weakening lines within the bowl section of each mold of the plurality of molds;
      the plurality of raised weakening lines dividing the bowl section in a matrix pattern;
   whereby the edible spoon is formed with a bowl divided into pieces that readily separate, thus aiding a user in consumption.

14. The device of claim 13, wherein the edible spoon is formed from corn flour.

15. The device of claim 13, wherein the edible spoon is formed from wheat flour.

16. The device of claim 14, wherein the edible spoon is further formed from chili pepper.

17. The device of claim 15, wherein the edible spoon is further formed from chili pepper.

18. The device of claim 13, wherein the edible spoon is formed from materials that resist disintegration due to contact with water.

* * * * *